United States Patent
Olson et al.

(10) Patent No.: US 8,832,464 B2
(45) Date of Patent: Sep. 9, 2014

(54) PROCESSOR AND METHOD FOR IMPLEMENTING INSTRUCTION SUPPORT FOR HASH ALGORITHMS

(75) Inventors: Christopher H. Olson, Austin, TX (US); Jeffrey S. Brooks, Austin, TX (US); Robert T. Golla, Round Rock, TX (US)

(73) Assignee: Oracle America, Inc., Redwood Shores, CA (US)

( * ) Notice: Subject to any disclaimer, the term of this patent is extended or adjusted under 35 U.S.C. 154(b) by 499 days.

(21) Appl. No.: 12/415,403

(22) Filed: Mar. 31, 2009

(65) Prior Publication Data

US 2010/0250966 A1 Sep. 30, 2010

(51) Int. Cl.
*G06F 12/14* (2006.01)
*H04L 9/32* (2006.01)
*H04L 9/00* (2006.01)
*G06F 9/30* (2006.01)
*G06F 21/76* (2013.01)
*H04L 9/12* (2006.01)
*H04L 9/18* (2006.01)
*H04L 9/06* (2006.01)
*G06F 9/38* (2006.01)

(52) U.S. Cl.
CPC ............ *G06F 12/1408* (2013.01); *G06F 21/76* (2013.01); *H04L 9/12* (2013.01); *H04L 9/18* (2013.01); *H04L 9/0643* (2013.01); *G06F 9/3802* (2013.01); *G06F 9/3851* (2013.01); *G06F 9/3836* (2013.01)
USPC ........... 713/190; 713/181; 380/262; 380/264; 712/205; 712/214

(58) Field of Classification Search
CPC ... G06F 12/1408; G06F 21/76; G06F 9/3802; G06F 9/3851; G06F 9/3836; H04L 9/12; H04L 9/18; H04L 9/0643
USPC ........... 713/190, 181; 380/262, 264; 712/205, 712/214

See application file for complete search history.

(56) References Cited

U.S. PATENT DOCUMENTS 5,067,069 A 11/1991 Fite et al.
5,109,495 A 4/1992 Fite et al.
6,028,939 A 2/2000 Yin (Continued)

OTHER PUBLICATIONS

U.S. Appl. No. 12/414,871 entitled "Apparatus and Method for Implementing Instruction Support for the Kasumi Cipher Algorithm", filed Mar. 31, 2009.

(Continued)

*Primary Examiner* — Aravind Moorthy
(74) *Attorney, Agent, or Firm* — Meyerton Hood Kivlin Kowert & Goetzel; Stephen J. Curran

(57) ABSTRACT

A processor including instruction support for implementing hash algorithms may issue, for execution, programmer-selectable hash instructions from a defined instruction set architecture (ISA). The processor may include a cryptographic unit that may receive instructions for execution. The instructions include hash instructions defined within the ISA. In addition, the hash instructions may be executable by the cryptographic unit to implement a hash that is compliant with one or more respective hash algorithm specifications. In response to receiving a particular hash instruction defined within the ISA, the cryptographic unit may retrieve a set of input data blocks from a predetermined set of architectural registers of the processor, and generate a hash value of the set of input data blocks according to a hash algorithm that corresponds to the particular hash instruction.

20 Claims, 8 Drawing Sheets

(56) References Cited

U.S. PATENT DOCUMENTS

| | | |
|---|---|---|
| 6,324,286 B1 | 11/2001 | Lai et al. |
| 6,333,983 B1 | 12/2001 | Enichen |
| 6,434,689 B2 | 8/2002 | Fleck et al. |
| 7,123,720 B2 | 10/2006 | Lim |
| 7,159,122 B2 | 1/2007 | Lundvall |
| 7,257,718 B2 | 8/2007 | Lundvall |
| 7,321,910 B2 | 1/2008 | Crispin |
| 7,392,399 B2 | 6/2008 | Grohoski et al. |
| 7,392,400 B2 | 6/2008 | Henry |
| 7,433,469 B2 | 10/2008 | Koshy et al. |
| 7,454,016 B2 | 11/2008 | Tsunoo |
| 7,460,666 B2 | 12/2008 | Morioka et al. |
| 7,496,196 B2 | 2/2009 | Jalfon et al. |
| 7,502,464 B2 | 3/2009 | Macchetti et al. |
| 7,502,943 B2 | 3/2009 | Henry |
| 7,532,722 B2 | 5/2009 | Crispin |
| 7,539,876 B2 | 5/2009 | Henry |
| 7,688,972 B2 | 3/2010 | Suen et al. |
| 7,697,684 B2 | 4/2010 | Matsui et al. |
| 7,720,220 B2 | 5/2010 | Lundvall |
| 7,725,736 B2 | 5/2010 | Lundvall |
| 7,844,053 B2 | 11/2010 | Crispin et al. |
| 7,848,515 B2 | 12/2010 | Dupaquis et al. |
| 8,050,401 B2 | 11/2011 | Kohnen |
| 8,077,867 B2 | 12/2011 | Nemoto et al. |
| 8,095,800 B2 | 1/2012 | Creary et al. |
| 2001/0042193 A1 | 11/2001 | Fleck et al. |
| 2003/0142818 A1 | 7/2003 | Raghunathan et al. |
| 2003/0198343 A1 | 10/2003 | Morioka et al. |
| 2004/0202317 A1 | 10/2004 | Demjanenko et al. |
| 2004/0225885 A1 | 11/2004 | Grohoski et al. |
| 2004/0228482 A1 | 11/2004 | Macchetti et al. |
| 2004/0230813 A1 | 11/2004 | Check |
| 2004/0230816 A1 | 11/2004 | Lundvall et al. |
| 2005/0089160 A1 | 4/2005 | Crispin |
| 2005/0238166 A1 | 10/2005 | Koshy et al. |
| 2006/0013387 A1 | 1/2006 | Suen et al. |
| 2006/0013388 A1 | 1/2006 | Suen et al. |
| 2006/0013391 A1 | 1/2006 | Suen et al. |
| 2006/0072746 A1 | 4/2006 | Tadepalli |
| 2007/0038867 A1 | 2/2007 | Verbauwhede et al. |
| 2007/0071236 A1 | 3/2007 | Kohnen |
| 2007/0226475 A1* | 9/2007 | Chaudhry et al. ............ 712/234 |
| 2008/0159528 A1 | 7/2008 | Feghali et al. |
| 2008/0170686 A1 | 7/2008 | Nemoto et al. |
| 2008/0181403 A1* | 7/2008 | Sakamoto ................ 380/258 |
| 2008/0240426 A1 | 10/2008 | Gueron et al. |
| 2009/0022307 A1* | 1/2009 | Torla ................... 380/28 |
| 2009/0060197 A1 | 3/2009 | Taylor et al. |
| 2009/0089584 A1* | 4/2009 | Bender et al. ............. 713/176 |
| 2009/0183161 A1 | 7/2009 | Kolinummi et al. |
| 2009/0214026 A1 | 8/2009 | Gueron et al. |
| 2009/0220071 A1 | 9/2009 | Gueron et al. |
| 2009/0254718 A1 | 10/2009 | Biscondi et al. |
| 2010/0082943 A1 | 4/2010 | Yamamoto |
| 2010/0125739 A1 | 5/2010 | Creary et al. |
| 2010/0142702 A1 | 6/2010 | Wolf et al. |
| 2010/0158241 A1 | 6/2010 | Gueron |
| 2010/0180118 A1 | 7/2010 | Nakatsugawa |
| 2010/0183143 A1 | 7/2010 | Yamamoto et al. |
| 2010/0208885 A1 | 8/2010 | Murphy |
| 2010/0220853 A1* | 9/2010 | Schneider ................ 380/29 |
| 2011/0258415 A1 | 10/2011 | Chou et al. |
| 2011/0264720 A1 | 10/2011 | Feghali et al. |
| 2011/0276760 A1 | 11/2011 | Chou |

OTHER PUBLICATIONS

U.S. Appl. No. 12/414,852 entitled "Apparatus and Method for Implementing Instruction Support for the Advanced Encryption Standard (AES) Algorithm", filed Mar. 31, 2009.

U.S. Appl. No. 12/414,755 entitled "Apparatus and Method for Implementing Instruction Support for the Data Encryption Standard (DES) Algorithm", filed Mar. 31, 2009.

U.S. Appl. No. 12/414,831 entitled "Apparatus and Method for Implementing Instruction Support for the Camellia Cipher Algorithm", filed Mar. 31, 2009.

Federal Information Processing Standards (FIPS) Publication 46-3, "Data Encryption Standard (DES)," Oct. 25, 1999.

3rd Generation Partnership Project (3GPP) Technical Specification TS 35.202 version 8.0.0 (Kasumi specification), Feb. 2009.

Request for Comments (RFC) 3713, "A Description of the Camellia Encryption Algorithm," Apr. 2004.

Request for Comments (RFC) 1321, "The MD5 Message-Digest Algorithm," Apr. 1992.

Federal Information Processing Standards (FIPS) Publication 180-2, "Secure Hash Standard," Aug. 1, 2002.

Intel Corporation "Intel® IXP2850 Network Processor Product Brief" 2002 Intel Corporation.

VIA Technologies and Centaur Technologies "VIA PadLock Programming Guide" Version 1.60, May 3, 2005.

Shay Gueron "Advanced Encryption Standard (AES) Instructions Set" Copyright © 2008, Intel Corporation.

Processing Standards Publication 197 "Announcing the Advanced Encryption Standard (AES)" Federal Information Processing Standards Publication 197 Nov. 26, 2001.

Aoki et al.; "Camellia: A 128-Bit Block Cipher Suitable for Multiple Platforms—Design and Analysis," Selected Areas in Cryptography (SAC), vol. 2012/2001, Aug. 2000; pp. 39-56.

House et al.; "Design of a Flexible Cryptographic Hardware Module," Memorial University of Newfoundland, Canada, CCECE 2004—CCGEI 2004, Niagara Falls, May 2004 IEEE; pp. 603-608.

Kavun et al.; "A Pipelined Camellia Architecture for Compact Hardware Implementation," 21st IEEE International Conference on Application-specific Systems, Architectures, and Processors (ASAP 2010), Jul. 7-9, 2010, Rennes, Frances; pp. 305-308.

Non-Final Office Action in corresponding U.S. Appl. No. 12/414,852, Dec. 20, 2012, pp. 1-14.

Non-Final Office Action in corresponding U.S. Appl. No. 12/414,852, Nov. 30, 2011, pp. 1-13.

Final Office Action in corresponding U.S. Appl. No. 12/414,831, Dec. 21, 2012, pp. 1-11.

Non-Final Office Action in corresponding U.S. Appl. No. 12/414,831, Nov. 30, 2011, pp. 1-11.

Non-Final Office Action in corresponding U.S. Appl. No. 12/414,831, Aug. 31, 2012, pp. 1-10.

Non-Final Office Action in U.S. Appl. No. 12/414,755, Nov. 21, 2011, pp. 1-21.

Non-Final Office Action in U.S. Appl. No. 12/414,871, Dec. 12, 2012, pp. 1-13.

Final Office Action in U.S. Appl. No. 12/414,871, Sep. 6, 2012, pp. 1-13.

Non-Final Office Action in U.S. Appl. No. 12/414,871, Nov. 25, 2011, pp. 1-11.

Stamenkovic et al.; "LEON-2: General Purpose Processor for a Wireless Engine," Design and Diagnostics of Electronic Circuits and systems, Apr. 2006 IEEE , vol., No., pp. 48-51, 0-0 O; doi: 10.11 09/DDECS.2006.1649569, URL: http://ieeexplore.ieee.org/stamp/stamp.jsp?tp=&arnumber=1649569&isnumber=34591.

Mitsuru Matsui, How Far Can We Go on the x64 Processors?, 2006, Information Technology R&D Center, Mitsubishi Electric Corporartion, Japan, 1-18.

Matsui, M., Nakajima, J., On the Power of Bitslice Implementation of Intel Core2 Processor, 2007, CHES 2007, LNCS 4727, pp. 121-134, 2007. Springer-Verlag Berlin Heidelberg 2007.

* cited by examiner

PROCESSOR AND METHOD FOR IMPLEMENTING INSTRUCTION SUPPORT FOR HASH ALGORITHMS

BACKGROUND

1. Field of the Invention

This invention relates to processors and, more particularly, to implementation of hash algorithms.

2. Description of the Related Art

Verifying the integrity of data, such as file data, program code, or communications data, for example, has become an increasing concern as electronic commerce and communication proliferates. For example, data integrity is continually under threat as new forms of computer viruses and other malware emerge. Moreover, stored data is subject to corruption due to unintentional events such as hardware failure, data communication errors, and the like. Compromised or corrupted data may result in undesirable consequences ranging from transient application malfunction to widespread data loss, data theft, or total system failure.

To provide a means for ascertaining data integrity, various types of hash algorithms have been developed. Generally speaking, a hash algorithm may be configured to generate a condensed representation, or hash value, of an input stream of data. For typical hash algorithms, any change to the input data stream may result in differing hash values. Thus, if a given computed hash value of a data stream does not match an earlier-computed hash value of that data stream, the integrity of the data stream may have been compromised. As an example, "known good" hash values of a data stream may be computed before the data stream is conveyed via an insecure medium and conveyed along with the data stream. At the receiving end, the hash value of the received data stream may be computed and compared against the received hash value to provide a data integrity check.

Numerous different types of hash algorithms have been defined, and increasingly sophisticated hash algorithms continue to be developed. To improve execution performance of such algorithms, they may be implemented within processor hardware. However, using individual logical instructions that are defined within the ISA can be problematic, as it is difficult to break down hash algorithms into their constituent instructions.

SUMMARY

Various embodiments of a processor and method for instruction support for implementing hash algorithms are disclosed. In one embodiment, a processor includes an instruction fetch unit that may be configured to issue, for execution, programmer-selectable instructions from a defined instruction set architecture (ISA). The processor may also include a cryptographic unit that may be configured to receive instructions for execution from the instruction fetch unit. The instructions include hash instructions defined within the ISA. For example, the instructions may include a Message Digest 5 (MD5) instruction, a Secure Hash Algorithm (SHA1) instruction, a SHA256 instruction and a SHA512 instruction. Accordingly, the hash instructions may be executable by the cryptographic unit to implement a hash that is compliant with one or more respective hash algorithm specifications. In response to receiving a particular hash instruction defined within the ISA, the cryptographic unit may retrieve a set of input data blocks from a predetermined set of architectural registers of the processor, and generate a hash value of the set of input data blocks according to the hash algorithm that corresponds to the particular hash instruction.

Figure 1:
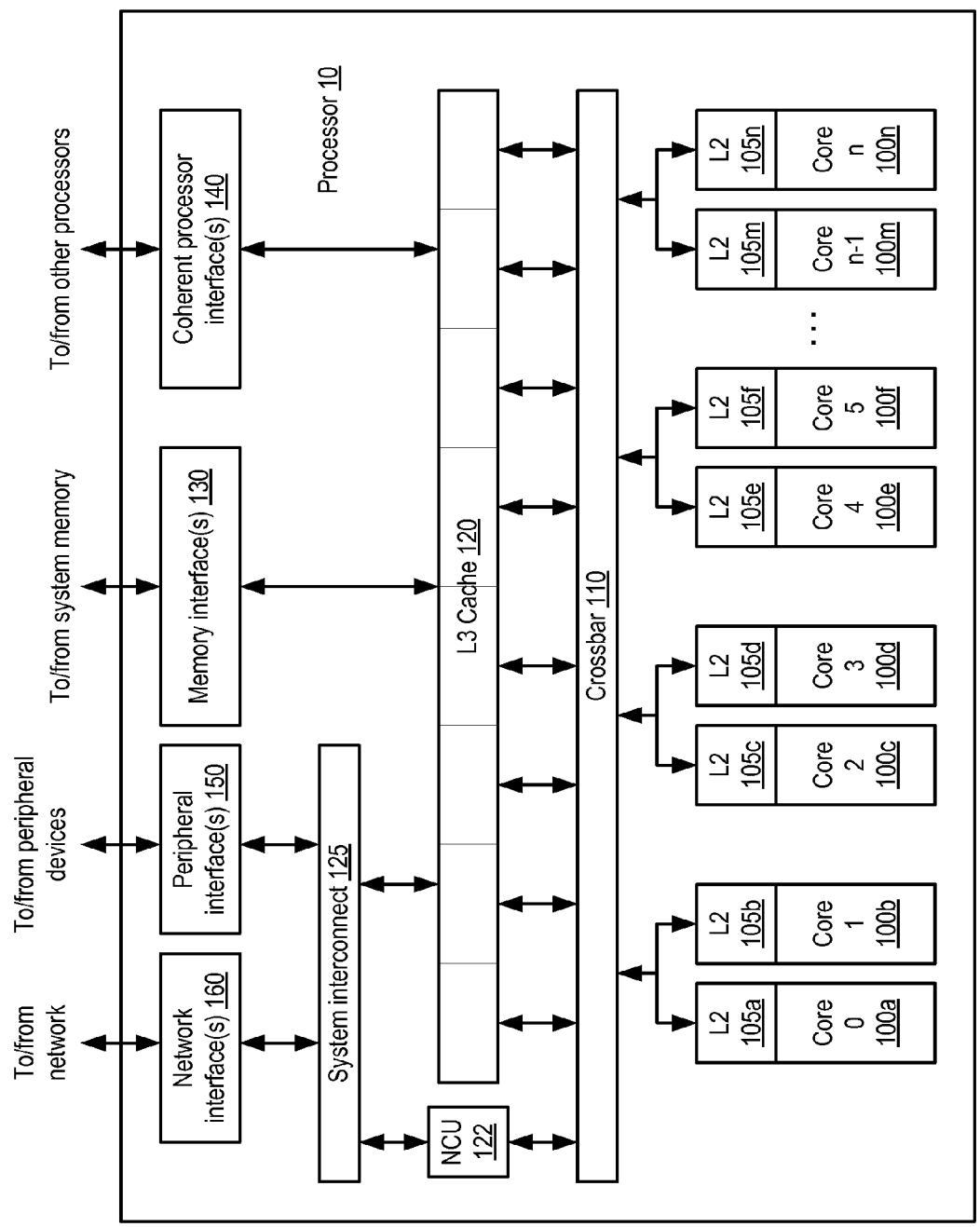
FIG. 1 is a block diagram illustrating one embodiment of a multithreaded processor.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In the following discussion, hardware support for various types of instructions that are specific to particular hash algorithms is explored. First, an overview is provided of one type of multithreaded processor in which hash-specific instruction support may be provided. Next, particular embodiments of hash-specific instruction support are described with respect to the MD5 hash, the SHA-1 hash, the SHA-256 hash, and the SHA-512 hash. Finally, an exemplary system embodiment including a processor that may implement instruction-level support for various hashes is discussed.

Overview of Multithreaded Processor Architecture

A block diagram illustrating one embodiment of a multithreaded processor 10 is shown in FIG. 1. In the illustrated embodiment, processor 10 includes a number of processor cores 100*a-n*, which are also designated "core 0" though "core n." Various embodiments of processor 10 may include varying numbers of cores 100, such as 8, 16, or any other suitable number. Each of cores 100 is coupled to a corresponding L2 cache 105*a-n*, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8-megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example, in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
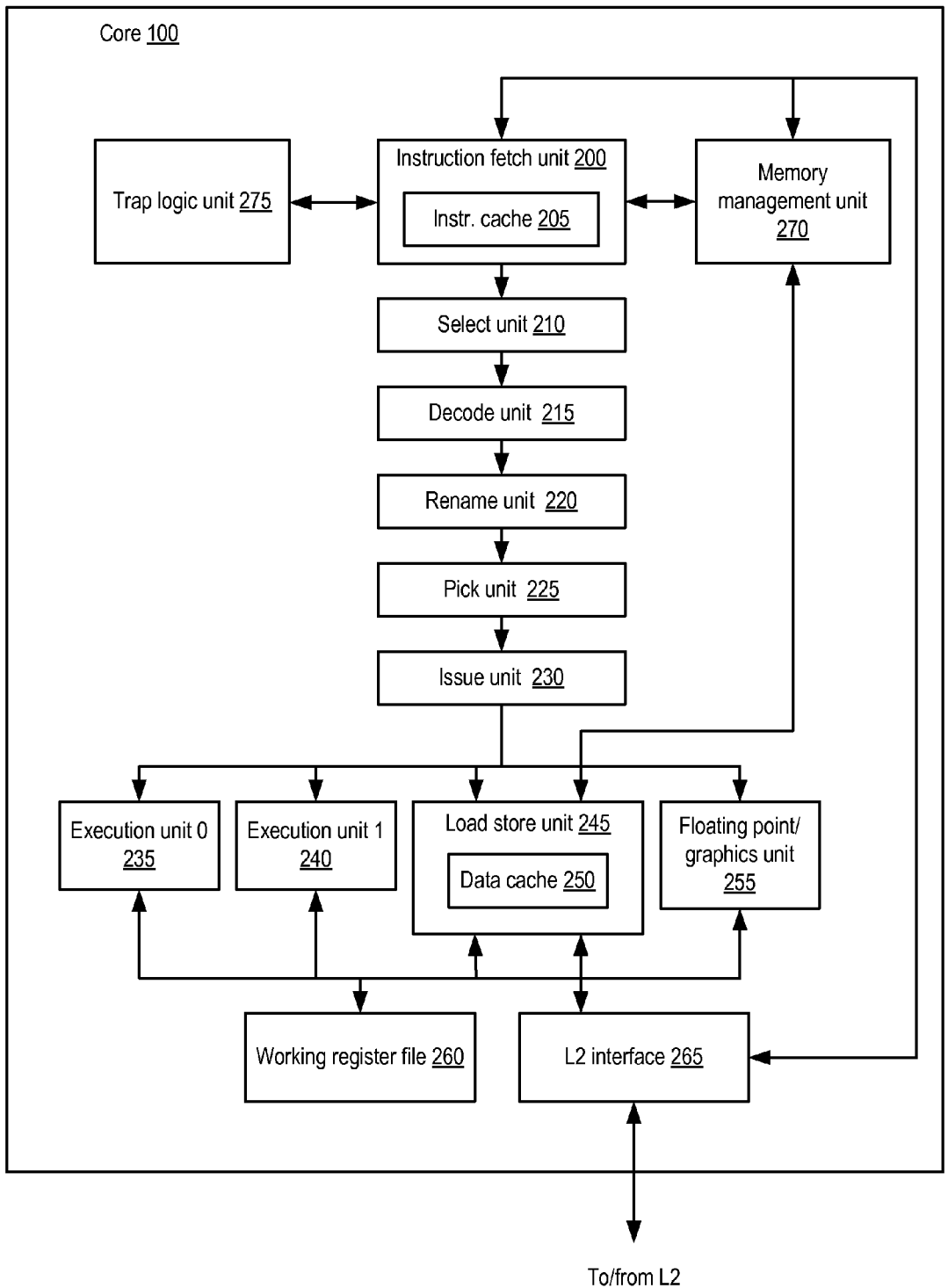
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit (FGU) 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, as described in greater detail below FGU 255 may include logic configured to implement hash or checksum algorithms such as Secure Hash Algorithm (SHA-1, SHA-256, SHA-512), or Message Digest 5 (MD5). FGU 255 may also include logic to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm in various embodiments. FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Hash Algorithm Execution

Figure 3:
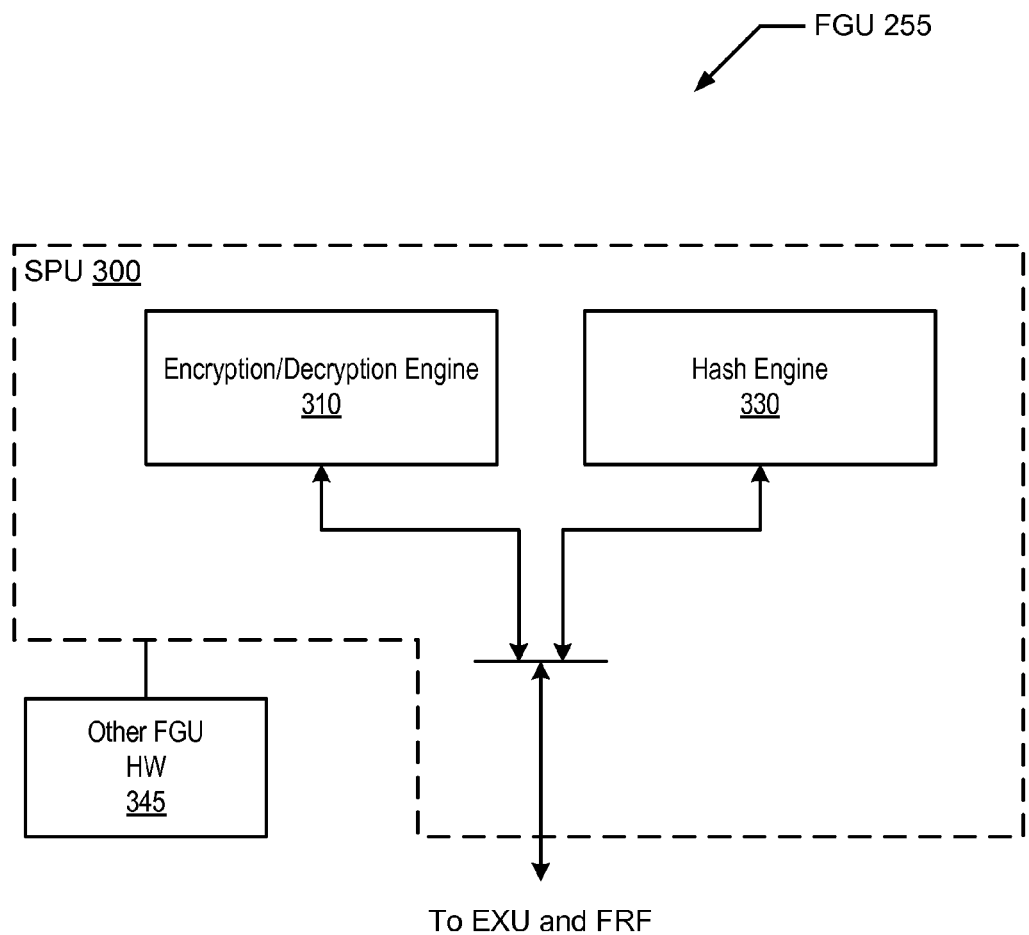
FIG. 3 is a block diagram illustrating one embodiment of a floating-point graphics unit including a cryptographic unit configured to implement hash algorithms.

As noted above, in some embodiments FGU 255 may be configured to support hashing algorithms and cryptographic operations including encryption/decryption using coprocessing hardware. More particularly, as shown in FIG. 3, an embodiment of FGU 255 includes a stream processing unit (SPU) 300 and various other FGU hardware 345. For example, in the illustrated embodiment, the SPU 300 includes a hash engine 330 and an encryption/decryption engine 310. It is noted that SPU 300 may be alternately referred to as a cryptographic unit (although it is noted that SPU 300 may also implement non-cryptographic algorithms in addition to or instead of cryptographic algorithms). It is also noted that in other embodiments of SPU 300, other numbers of engines may be used to implement additional/different or fewer cryptographic and Hash algorithms.

As noted above and described in greater detail below, the ISA may include specific programmer visible instructions that may allow software to directly control the engines within SPU 300. As such, the other FGU hardware 345 may include logic to decode and/or route the encryption/decryption and hashing instructions or their corresponding operations to the corresponding engines.

In some embodiments, SPU 300 may be configured to implement one or more cryptographic hash algorithms, which may also be referred to as secure hash algorithms or simply as hash algorithms. Generally speaking, a hash algorithm is an algorithm configured to produce a condensed representation of an input stream of data, or message. Such a condensed representation may also be referred to variously as a hash, hash value, signature, fingerprint, or digest of the input message. A hash algorithm may be cryptographically secure to the extent that it is computationally difficult to construct a message that generates a given hash value or to construct two different messages that each generate the same hash value. These properties may yield a very high probability that any modification to a given message (in some cases, even of only one bit) will result in a different hash value. Among various other applications, hash algorithms may be useful for ensuring data integrity, for example by enabling the detection of changes to a message due to errors or tampering.

Instruction Support for the Hash Engine

As shown in FIG. 3, SPU 300 includes a Hash engine 330, which in one embodiment, may be configured to execute instructions that implement a number of hash algorithms. One such hash algorithm is given by the Message Digest 5 (MD5) standard, one version of which is published as Request for Comments (RFC) 1321, as promulgated by the Internet Engineering Task Force (IETF). The MD5 algorithm iteratively processes a 512-bit data block to produce a 128-bit hash. Other hash algorithms are given by the Secure Hash Signature Standard, one version of which is published as Federal Information Processing Standards Publication 180-2 (FIPS 180-2), dated Aug. 1, 2002. In the FIPS 180-2 specification, several hash algorithms are described, including Secure Hash Algorithm (SHA) SHA-1, SHA-256, and SHA-512. In one embodiment, the SHA-1 and SHA-256 algorithms iteratively process a message in 512-bit blocks to produce a 160-bit hash and a 256-bit hash of the message, respectively, as described in greater detail below. The SHA-512 algorithm iteratively processes a message in 1024-bit blocks to produce a 512-bit hash. It is contemplated that in some embodiments, other hash algorithms using different block sizes and producing differently-sized hash values may be employed.

The hash instructions may be defined within the ISA implemented by processor 10, such that processor 10 may be configured to provide specific instruction-level support for the MD5 hash, the SHA-1 hash, the SHA-256 hash, and the SHA-512 hash. As described in greater detail below, in such an implementation, a user of processor 10 may be able to specify a small number of instructions to implement these hash algorithms. This is in contrast to a processor that lacks instruction level support for hash algorithms. In such processors, it may be difficult to break down hash algorithms into normal ISA instructions due to operand and result restrictions. Thus, it may take thousands of instructions for software to emulate the hash. In turn, having this instruction level support may result in more compact code and/or faster hash execution, particularly for smaller input data blocks.

In the following discussion, the general operation of the various hash algorithms is first described. Examples of particular hash instructions that hash engine 330 may execute to implement the supported hash algorithms are then discussed, including some code examples that implement such instructions.

Hash Algorithms

In some hash algorithm embodiments, a given data block may be iteratively processed in order to arrive at a hash value for that block. That is, computing a given hash value of a particular data block according to a given hash algorithm may include a plurality of iterations upon that data block. Also, in some hash algorithm embodiments, each iteration operates on one data word of the data block. For example, a hash algorithm may be configured to progress through the data words included in a data block in an order specified by the algorithm.

In some embodiments, during the course of iterating, the given data block undergoing processing may be transformed according to the hash algorithm. For example, in one version of the MD5 algorithm, a given 512-bit data block comprising 16 32-bit data words undergoes 64 iterations grouped into four rounds of sixteen iterations each. During round 1, the words of the data block are processed in their original order, at a rate of one data word per iteration. For subsequent rounds, the order in which data words are processed varies as follows:

| | |
|---|---|
| Round 1: | 00 01 02 03 04 05 06 07 08 09 10 11 12 13 14 15 |
| Round 2: | 01 06 11 00 05 10 15 04 09 14 03 08 13 02 07 12 |
| Round 3: | 05 08 11 14 01 04 07 10 13 00 03 06 09 12 15 02 |
| Round 4: | 00 07 14 05 12 03 10 01 08 15 06 13 04 11 02 09 |

That is, for round 1, the words of the data block are processed in their original order. For round 2, the first data word processed is the data word originally in position 01, and the position from which subsequent words are selected for processing is derived by adding 5 to the previous word, modulo 16. Similarly, for rounds 3 and 4, the first data word processed is the data word originally in position 05 and 00, respectively. For these rounds, the position from which subsequent words are selected for processing is derived by adding 3 and 7, respectively, to the previous word, modulo 16.

For other hash algorithms, the transformations applied to the data block during iteration may differ. For example, one version of the SHA-1 algorithm specifies 80 iterations per 16-word, 512-bit data block. For iterations 0 through 15 of SHA-1, the data words are processed in order, similar to round 1 of the MD5 algorithm shown above. For iterations 16 through 79, the data word W[k] for a given iteration k is given by:

$$W[k] = ROTL\_1(W[k-16]\textasciicircum W[k-14]\textasciicircum W[k-8]\textasciicircum W[k-3])$$

where ROTL_1(x) specifies a logical rotate left of x by 1 bit position, and where ^ denotes a logical XOR operation. For example, the word processed during iteration 17 of the SHA-1 algorithm is given by the logical XOR of words 01, 03, 09 and 14, rotated left by 1 bit position. Unlike the MD5 algorithm, in which individual data words are reordered and reutilized by the hash algorithm as illustrated above, a given data word in SHA-1 is processed once. After a given data word has been processed, and after any subsequent data words dependent on the given data word have been determined (e.g., by the relation given above), the given data word may be discarded.

One version of the SHA-256 algorithm specifies 64 iterations per 16-word, 512-bit data block. Like SHA-1 and MD5, the data words are processed in order for iterations 0 through 15. For iterations 16 through 63, data words are determined dependent on previous words in a manner similar to SHA-1. For these iterations, the data word W[k] for a given iteration k is given by the sum, modulo $2^{32}$.

$$W[k]=ss\_1\_256(W[k-2])+W[k-7]+ss\_0\_256(W[k-15])+W[k-16]$$

where:

$$ss\_0\_256(x)=ROTR\_7(x)\hat{}ROTR\_18(x)\hat{}SHR\_3(x)$$

$$ss\_1\_256(x)=ROTR\_17(x)\hat{}ROTR\_19(x)\hat{}SHR\_10(x)$$

and where ROTR_n(x) and SHR_n(x) specify a logical rotate right and a logical shift right of x by n bit positions, respectively. Like SHA-1, in SHA-256, after a given data word has been processed, and after any subsequent data words dependent on the given data word have been determined, the given data word may be discarded.

One version of the SHA-512 algorithm is similar to the SHA-256 algorithm. However, instead of 32-bit words, the SHA-512 algorithm specifies 80 iterations per 16 words, and each word is 64 bits. In addition, the SHA-512 algorithm uses different shift and rotate amounts and provides a 512-bit output hash value. The data words are processed in order for iterations 0 through 15. For iterations 16 through 79, data words are determined dependent on previous words in a manner similar to SHA-256. For these iterations, the data word W[k] for a given iteration k is given by the sum modulo $2^{64}$:

$$W[k]=ss\_1\_512(W[k-2])+W[k-7]+ss\_0\_256(W[k-15])+W[k-16]$$

where:

$$ss\_0\_512(x)=ROTR\_1(x)\hat{}ROTR\_8(x)\hat{}SHR\_7(x)$$

$$ss\_1\_512(x)=ROTR\_19(x)\hat{}ROTR\_61(x)\hat{}SHR\_6(x)$$

Accordingly, a number of logical operations may be performed such as logical shift right, logical rotate right, logical rotate left, and Exclusive-Or. Depending on the hash algorithm, a specific combination of these operations may be performed a specified number of times.

Hash Engine Instruction Support

As noted above, implementing the hash algorithms using general-purpose ISA instructions to support those operations may not be feasible. However, in one embodiment, hash engine 330 may be configured to provide support for certain ISA instructions that are particular to the above hash algorithms, such that execution of individual ones of the hash-specific instructions results in hash engine 330 performing entire corresponding hash operations to produce a hash value.

Figure 4:
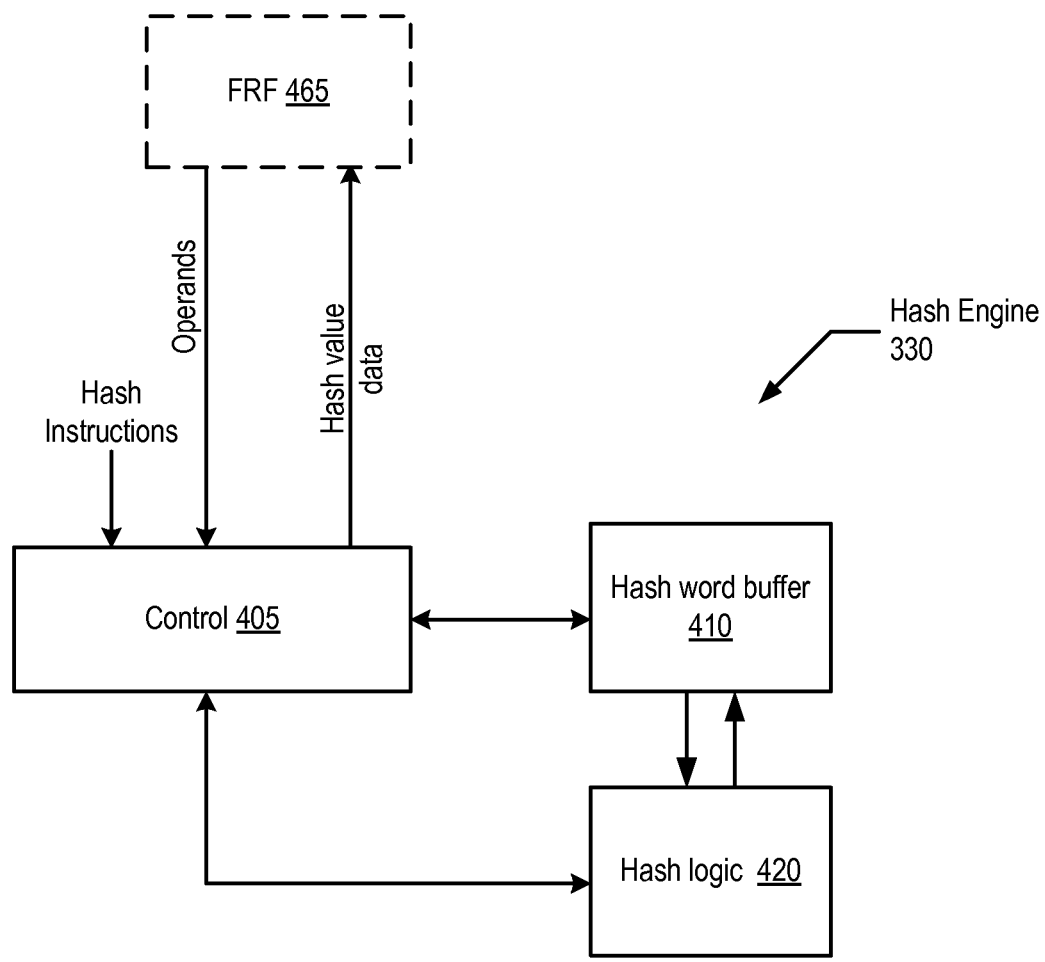
FIG. 4 is a block diagram of one embodiment of a cryptographic engine configured to execute instructions to implement various hash algorithms.

One such embodiment of hash engine 330 is illustrated in FIG. 4. As shown, hash engine 330 includes hash logic 420, which is coupled to both control logic 405 and to a hash word buffer 410. In various embodiments, hash word buffer 410 may operate cooperatively with hash logic 420, and control logic 405 to perform the appropriate hash algorithm in response to receiving a corresponding hash instruction. For example, in one embodiment, hash logic 420 may be configured to implement a plurality of different hash algorithms, such as the MD5, SHA-1, SHA-256, and SHA-512 algorithms. Further, hash logic 420 may be configured to iteratively compute a hash value of a data block of a message according to one of the implemented hash algorithms. In various embodiments, SPU 300 may also include additional logic not shown, such as additional hash algorithm control logic, combinatorial logic, and/or logic configured to perform different types of operations. Collectively, the illustrated features of hash engine 330 may be configured to implement the MD5, SHA-1, SHA-256, and SHA-512 hashes as described above. It is noted that this partitioning of hash functionality within hash engine 330 is merely one example chosen to facilitate exposition. Other configurations of hash engine 330 are possible and contemplated in which logic may be differently partitioned to implement support for hash-specific instructions, including instructions that differ from those described below. Additionally, hash engine 330 may utilize the floating point register file (FRF 465), which may or may not be part of the FGU 255 in various embodiments, and/or the integer register file (IRF) for storing the input data blocks to be hashed, as well as the final hash value described above.

In one embodiment, hash word buffer 410 (or simply word buffer 410) may be configured to store a data block during hash value computation by hash logic 420. In one embodiment, word buffer 410 may include a plurality of data word positions. In such an embodiment, a given data block may be stored as a plurality of data words within the corresponding data word positions. For example, in one embodiment a 512-bit data block may be stored as a plurality of 32-bit data words in a word buffer 410 having 16 data word positions.

In various implementations, word buffer 410 may be configured in different ways. In one embodiments, substantial implementation area may be conserved by efficiently configuring word buffer 410 to store data blocks during computing of several different hash algorithms by hash logic 420, rather than providing respective instances of word buffer 410 corresponding to each different hash algorithm. However, a conventional design in which each data word position of word buffer 410 is fixed and the hash algorithm iterates over data word positions in sequence may require additional multiplexer logic, which in turn increases implementation area. For example, in one such conventional embodiment, any of the data words of word buffer 410 may be an input to hash logic 420 during some iteration, such that a 16:1 multiplexer is required to select the next word to be processed by hash logic 420. Additionally, for the SHA-1, SHA-256, and SHA-512 algorithms described above, a next data word value for a given data word position depends on previous data word values, which may require additional 16:1 multiplexers to implement. Accordingly, as described in greater detail below in conjunction with the description of FIG. 5, one particular word buffer embodiment is shown.

In some embodiments, control logic 405 may include logic (not shown), that may be configured to control the behavior of word buffer 410 and hash logic 420 during hash algorithm execution. More particularly, control logic 405 may receive and/or execute hash instructions and/or operations corresponding to the hash instructions. In response, control logic 405 may provide control signals to hash word buffer 410 and hash logic 420 to enable them to perform the necessary operations that correspond to the particular hash instruction that was received. Further, control logic 405 may be configured to begin retrieving the input data blocks and any initial values from specific registers within the designated register file (e.g., FRF 465 as denoted by the dotted lines), and to write the hash value back to specific registers within the designated FRF upon completion of the hash instruction. In one embodiment, to read the data directly from FRF 465, instructions prior to the hash instruction must have committed. In one embodiment, a pre-sync may be used. In Table 2 below, one embodiment of FRF 465 organization is shown during hash instruction execution.

TABLE 2

FRF organization

| entry | MD5 | Sha1 | Sha256 | Sha512 | FRF access | |
|---|---|---|---|---|---|---|
| F0 | IV0 | IV0 | IV0 | IV0 | rd0 rs1 | applies to all hashes |
| F2 | IV1 | IV1 | IV1 | IV1 | rd0 rs2 | |
| F4 | — | IV2 | IV2 | IV2 | rd0 rs3 | |
| F6 | — | — | IV3 | IV3 | rd1 rs1 | |
| F8 | Data0 | Data0 | Data0 | IV4 | rd1 rs2 | |
| F10 | Data1 | Data1 | Data1 | IV5 | rd1 rs3 | |
| F12 | Data2 | Data2 | Data2 | IV6 | rd2 rs1 | |
| F14 | Data3 | Data3 | Data3 | IV7 | rd2 rs2 | |
| F16 | Data4 | Data4 | Data4 | Data0 | rd2 rs3 | |
| F18 | Data5 | Data5 | Data5 | Data1 | rd3 rs1 | |
| F20 | Data6 | Data6 | Data6 | Data2 | rd3 rs2 | |
| F22 | Data7 | Data7 | Data7 | Data3 | rd3 rs3 | |
| F24 | — | — | — | Data4 | rd4 rs1 | applies only to SHA512 |
| F26 | — | — | — | Data5 | rd4 rs2 | |
| F28 | — | — | — | Data6 | rd4 rs3 | |
| F30 | — | — | — | Data7 | rd5 rs1 | |
| F32 | — | — | — | Data8 | rd5 rs2 | |
| F34 | — | — | — | Data9 | rd5 rs3 | |
| F36 | — | — | — | Data10 | rd6 rs1 | |
| F38 | — | — | — | Data11 | rd6 rs2 | |
| F40 | — | — | — | Data12 | rd6 rs3 | |
| F42 | — | — | — | Data13 | rd7 rs1 | |
| F44 | — | — | — | Data14 | rd7 rs2 | |
| F46 | — | — | — | Data15 | rd7 rs3 | |
| F48 | — | — | — | — | | |
| F50 | — | — | — | — | | |
| F52 | — | — | — | — | | |
| F54 | — | — | — | — | | |
| F56 | — | — | — | — | | |
| F58 | — | — | — | — | | |
| F60 | — | — | — | — | | |
| F62 | — | — | — | — | | |

When an individual hash operation completes, the results are written back to specific registers within FRF 465. To do this, hash engine 330 stalls the commit. By stalling commit, the write ports to FRF 465 may be available to hash engine 330 without hazard. Hash engine 330 may write the result exactly on top of the IV locations shown above. This allows for chaining the hash operations together without the need to move any intermediate data. By stalling the commit pipeline, hash engine 330 is able to write the 128-bit (MD5) to 512-bit (SHA-512) results directly into the FRF without pushing the results through the rename mechanism.

In addition, in one embodiment, once a given hash instruction is picked, a block may be created behind that instruction to all slot 1 (e.g., ALU, branch, and float) instructions so that FRF 465 can be accessed exclusively by the hash engine 330. In one particular embodiment, the block may be established by the pick unit 225 of FIG. 2 to prevent any other instruction from issuing to slot 1. Each hash instruction takes a predetermined number of cycles to execute and return a hash value to FRF 465. Accordingly, the pick unit 225 may block access to slot 1 for the requisite number of cycles for each hash instruction picked. However, the block only affects slot 1; thus slot 0 accesses may continue normally.

In one embodiment, hash logic 420, in combination with control logic 405, may be configured to execute hash instructions defined within the ISA of processor 10 and denoted with the following instruction mnemonics: MD5, SHA1, SHA256, and SHA512 (though any suitable mnemonics may be employed). These instructions may be referred to collectively in the following discussions as the hash instructions, where appropriate. In various embodiments, the control logic 405 may directly decode the hash instructions from opcode bits sent from upstream pipeline stages, or may receive already-decoded or partially-decoded signals indicative of the occurrence of hash instructions. Control logic 405 may responsively provide corresponding control signals to the word buffer 410 and to hash logic 420 to execute the appropriate hash instruction.

In addition, in one embodiment, the hash instructions defined within the ISA may be executed completely without the need for any additional information other than what is encoded within the instruction itself (e.g., within the opcode bits of the instruction). In other words, all of the necessary source and destination information is implicitly included within each of the above hash instructions, such that when a given hash instruction is executed by the hash engine 330, the control logic 405 implicitly knows the hash operation to be performed, the source registers (e.g., FRF 465) for retrieving the message data blocks, and the destination registers (e.g., FRF 465) for storing the resultant hash value.

Hash Engine MD5 Instruction Support

In one embodiment, the MD5 instruction generates a 128-bit hash value from a 512-bit data block according to the MD5 hash algorithm. The MD5 instruction generates the hash value using combinations of Rotate Left, XOR, and modulo 32 addition operations.

One example of SPARC assembly language code that illustrates the use of the MD5 instruction to generate a hash value is as follows:

```
        setx    hash_iv, %g1,   %l4     !# Load IV
        ldd     [%l4 + 0x000],  %f0
        ldd     [%l4 + 0x008],  %f2
        setx    hash_data, %g1, %l4
block1:
        ldd     [%l4 + 0x000],  %f8     !# Load 1st 512-bit data block
        ldd     [%l4 + 0x008],  %f10
        ldd     [%l4 + 0x010],  %f12
        ldd     [%l4 + 0x018],  %f14
        ldd     [%l4 + 0x020],  %f16
        ldd     [%l4 + 0x028],  %f18
        ldd     [%l4 + 0x030],  %f20
        ldd     [%l4 + 0x038],  %f22
        md5                             !# MD5 result overwrites
                                        original IV (F0 & F2)
block2:
        ldd     [%l4 + 0x000],  %f8     !# Load next 512-bit data
                                        block
        ldd     [%l4 + 0x008],  %f10
        ldd     [%l4 + 0x010],  %f12
        ldd     [%l4 + 0x018],  %f14
        ldd     [%l4 + 0x020],  %f16
        ldd     [%l4 + 0x028],  %f18
        ldd     [%l4 + 0x030],  %f20
        ldd     [%l4 + 0x038],  %f22
        md5                             !# MD5 result overwrites
                                        previous result (F0 & F2)
block3:
        ldd     [%l4 + 0x000],  %f8     !# Load next 512-bit data
                                        block
        ldd     [%l4 + 0x008],  %f10
        ldd     [%l4 + 0x010],  %f12
        ldd     [%l4 + 0x018],  %f14
        ldd     [%l4 + 0x020],  %f16
        ldd     [%l4 + 0x028],  %f18
        ldd     [%l4 + 0x030],  %f20
        ldd     [%l4 + 0x038],  %f22
        md5                             !# MD5 result overwrites
                                        previous result (F0 & F2)
block4:
        ldd     [%l4 + 0x000],  %f8     !# Load next 512-bit data
                                        block
        ldd     [%l4 + 0x008],  %f10
        ldd     [%l4 + 0x010],  %f12
        ldd     [%l4 + 0x018],  %f14
        ldd     [%l4 + 0x020],  %f16
        ldd     [%l4 + 0x028],  %f18
```

```
ldd     [%l4 + 0x030],  %f20
ldd     [%l4 + 0x038],  %f22
md5                             !# MD5 result overwrites
                                   previous result (F0 & F2)
setx    result, %g1,    %l4
std     %f0,    [%l4 + 0x000]
std     %f2,    [%l4 + 0x008]
```

In this exemplary code sequence, the MD5 hash processed four 512-bit data blocks. In one embodiment, software may pad the final data block, per algorithm specifications, by repeating the code segment labeled "blockn" as necessary. In each block, the floating-point registers are loaded with the corresponding 512-bit block of data. As described above, upon execution of the MD5 instruction, the control logic 405 and/or hash logic 420 may retrieve the data block from the appropriate floating-point registers and place them in the hash word buffer 410. As shown, the MD5 instruction hash value overwrites the previous result in the floating-point registers %f0 and %f2.

Hash Engine SHA-1 Instruction Support

In one embodiment, the SHA1 instruction generates a 128-bit hash value from a 512-bit data block according to te SHA-1 algorithm. The SHA1 instruction generates the hash value using a combination of Rotate left, logical operations, and modulo 32 addition. An embodiment of the logic used to generate the SHA1 next value is described further below.

One example of SPARC assembly language code that illustrates the use of the SHA1 instruction to generate a hash value is as follows:

```
setx    hash_iv, %g1,   %l4     !# Load IV
ldd     [%l4 + 0x000],  %f0
ldd     [%l4 + 0x008],  %f2
ldd     [%l4 + 0x010],  %f4
setx    hash_data, %g1, %l4
block1:
ldd     [%l4 + 0x000],  %f8     !# Load 1st 512-bit data block
ldd     [%l4 + 0x008],  %f10
ldd     [%l4 + 0x010],  %f12
ldd     [%l4 + 0x018],  %f14
ldd     [%l4 + 0x020],  %f16
ldd     [%l4 + 0x028],  %f18
ldd     [%l4 + 0x030],  %f20
ldd     [%l4 + 0x038],  %f22
sha1                            !# SHA1 result overwrites
                                   original IV (F0 - F4)
block2:
ldd     [%l4 + 0x000],  %f8     !# Load next 512-bit data
                                   block
ldd     [%l4 + 0x008],  %f10
ldd     [%l4 + 0x010],  %f12
ldd     [%l4 + 0x018],  %f14
ldd     [%l4 + 0x020],  %f16
ldd     [%l4 + 0x028],  %f18
ldd     [%l4 + 0x030],  %f20
ldd     [%l4 + 0x038],  %f22
sha1                            !# SHA1 result overwrites
                                   previous result (F0 - F4)
setx    result, %g1,    %l4
std     %f0,    [%l4 + 0x000]
std     %f2,    [%l4 + 0x008]
std     %f4,    [%l4 + 0x010]
```

In this exemplary code sequence, the SHA1 hash processed two 512-bit data blocks. In one embodiment, software may pad the final data block, per algorithm specifications, by repeating the code segment labeled "blockn" as necessary. In each block, the floating-point registers are loaded with the corresponding 512-bit block of data. As described above, upon execution of the SHA1 instruction, the control logic 405 and/or hash logic 420 may retrieve the data block from the floating-point registers and place them in the hash word buffer 410. As shown, the SHA1 instruction causes hash engine 330 to overwrite the previous result with the hash value in the floating-point registers %f0, %f2, and %f4.

Hash Engine SHA-256 Instruction Support

In one embodiment, the SHA256 instruction generates a 256-bit hash value from a 512-bit data block according to the SHA-256 algorithm. The SHA256 instruction generates the hash value using a combination of Rotate Right, Shift Right, modulo 32 addition, and logical operations. An embodiment of the logic used to generate the SHA256 next value is described further below.

One example of SPARC assembly language code that illustrates the use of the SHA256 instruction to generate a hash value is as follows:

```
setx    hash_iv, %g1, %l4       !# Load IV
ldd     [%l4 + 0x000], %f0
ldd     [%l4 + 0x008], %f2
ldd     [%l4 + 0x010], %f4
ldd     [%l4 + 0x018], %f6
setx    hash_data, %g1, %l4
block1:
ldd     [%l4 + 0x000], %f8      !# Load 1st 512-bit data block
ldd     [%l4 + 0x008], %f10
ldd     [%l4 + 0x010], %f12
ldd     [%l4 + 0x018], %f14
ldd     [%l4 + 0x020], %f16
ldd     [%l4 + 0x028], %f18
ldd     [%l4 + 0x030], %f20
ldd     [%l4 + 0x038], %f22
sha256                          !# SHA256 result overwrites
                                   original IV (F0 - F6)
block2:
ldd     [%l4 + 0x000], %f8      !# Load next 512-bit data
                                   block
ldd     [%l4 + 0x008], %f10
ldd     [%l4 + 0x010], %f12
ldd     [%l4 + 0x018], %f14
ldd     [%l4 + 0x020], %f16
ldd     [%l4 + 0x028], %f18
ldd     [%l4 + 0x030], %f20
ldd     [%l4 + 0x038], %f22
sha256                          !# SHA256 result overwrites
                                   previous result (F0 - F6)
setx    result, %g1,    %l4
std     %f0,    [%l4 + 0x000]
std     %f2,    [%l4 + 0x008]
std     %f4,    [%l4 + 0x010]
std     %f6,    [%l4 + 0x018]
```

In this exemplary code sequence, the SHA256 hash processed two 512-bit data blocks. In one embodiment, software may pad the final data block, per algorithm specifications, by repeating the code segment labeled "blockn" as necessary. In each block, the floating-point registers are loaded with the corresponding 512-bity block of data. As described above, upon execution of the SHA256 instruction, the control logic 405 and/or hash logic 420 may retrieve the data block from the floating-point registers and place them in the hash word buffer 410. As shown, the SHA256 instruction causes hash engine 330 to overwrite the previous result with the hash value in the floating-point registers %f0 through %f6.

Hash Engine SHA-512 Instruction Support

In one embodiment, the SHA512 instruction generates a 512-bit hash value from a 1024-bit data block according to the SHA-512 algorithm. The SHA512 instruction generates the hash value using a combination of Rotate Right, Shift Right, modulo 64 addition, and logical operations. An embodiment of the logic used to generate the SHA512 next value is described further below.

One example of SPARC assembly language code that illustrates the use of the SHA512 instruction to generate a hash value is as follows:

```
    setx    hash_iv, %g1,   %l4         !# Load IV
    ldd     [%l4 + 0x000],  %f0
    ldd     [%l4 + 0x008],  %f2
    ldd     [%l4 + 0x010],  %f4
    ldd     [%l4 + 0x018],  %f6
    ldd     [%l4 + 0x020],  %f8
    ldd     [%l4 + 0x028],  %f10
    ldd     [%l4 + 0x030],  %f12
    ldd     [%l4 + 0x038],  %f14
    setx    hash_data, %g1, %l4
block1:
    ldd     [%l4 + 0x000], %f16         !# Load 1st 1024-bit data
                                        block
    ldd     [%l4 + 0x008], %f18
    ldd     [%l4 + 0x010], %f20
    ldd     [%l4 + 0x018], %f22
    ldd     [%l4 + 0x020], %f24
    ldd     [%l4 + 0x028], %f26
    ldd     [%l4 + 0x030], %f28
    ldd     [%l4 + 0x038], %f30
    ldd     [%l4 + 0x040], %f32
    ldd     [%l4 + 0x048], %f34
    ldd     [%l4 + 0x050], %f36
    ldd     [%l4 + 0x058], %f38
    ldd     [%l4 + 0x060], %f40
    ldd     [%l4 + 0x068], %f42
    ldd     [%l4 + 0x070], %f44
    ldd     [%l4 + 0x078], %f46
    sha512                              !# SHA512 result overwrites
                                        original IV (F0 - F14)
block2:
    ldd     [%l4 + 0x000], %f16         !# Load next 1024-bit data
                                        block
    ldd     [%l4 + 0x008], %f18
    ldd     [%l4 + 0x010], %f20
    ldd     [%l4 + 0x018], %f22
    ldd     [%l4 + 0x020], %f24
    ldd     [%l4 + 0x028], %f26
    ldd     [%l4 + 0x030], %f28
    ldd     [%l4 + 0x038], %f30
    ldd     [%l4 + 0x040], %f32
    ldd     [%l4 + 0x048], %f34
    ldd     [%l4 + 0x050], %f36
    ldd     [%l4 + 0x058], %f38
    ldd     [%l4 + 0x060], %f40
    ldd     [%l4 + 0x068], %f42
    ldd     [%l4 + 0x070], %f44
    ldd     [%l4 + 0x078], %f46
    sha512                              !# SHA512 result overwrites
                                        previous result (F0 - F14)
    setx    result, %g1,    %l4
    std     %f0,    [%l4 + 0x000]
    std     %f2,    [%l4 + 0x008]
    std     %f4,    [%l4 + 0x010]
    std     %f6,    [%l4 + 0x018]
    std     %f8,    [%l4 + 0x020]
    std     %f10,   [%l4 + 0x028]
    std     %f12,   [%l4 + 0x030]
    std     %f14,   [%l4 + 0x038]
```

In this exemplary code sequence, the SHA512 hash processed two 1024-bit data blocks. In one embodiment, software may pad the final data block, per algorithm specifications, by repeating the code segment labeled "blockn" as necessary. In each block, the floating-point registers are loaded with the corresponding 1024-bit block of data. As described above, upon execution of the SHA512 instruction, the control logic 405 and/or hash logic 420 may retrieve the data block from the floating-point registers and place them in the word buffer 410. As shown, the SHA512 instruction causes hash engine 330 to overwrite the previous result with the hash value in the floating-point registers % f0 through % f14.

It is noted that the above exemplary assembly language code sequences use the setx instruction. However, the setx instruction is defined within the SPARC ISA as a synthetic instruction. As described in section G.3 of the SPARC Architecture Manual Version 9, synthetic instructions may be provided in a SPARC assembler for the convenience of assembly language programmers, and they do generate instructions. The synthetic instructions map to actual instructions.

Figure 5:
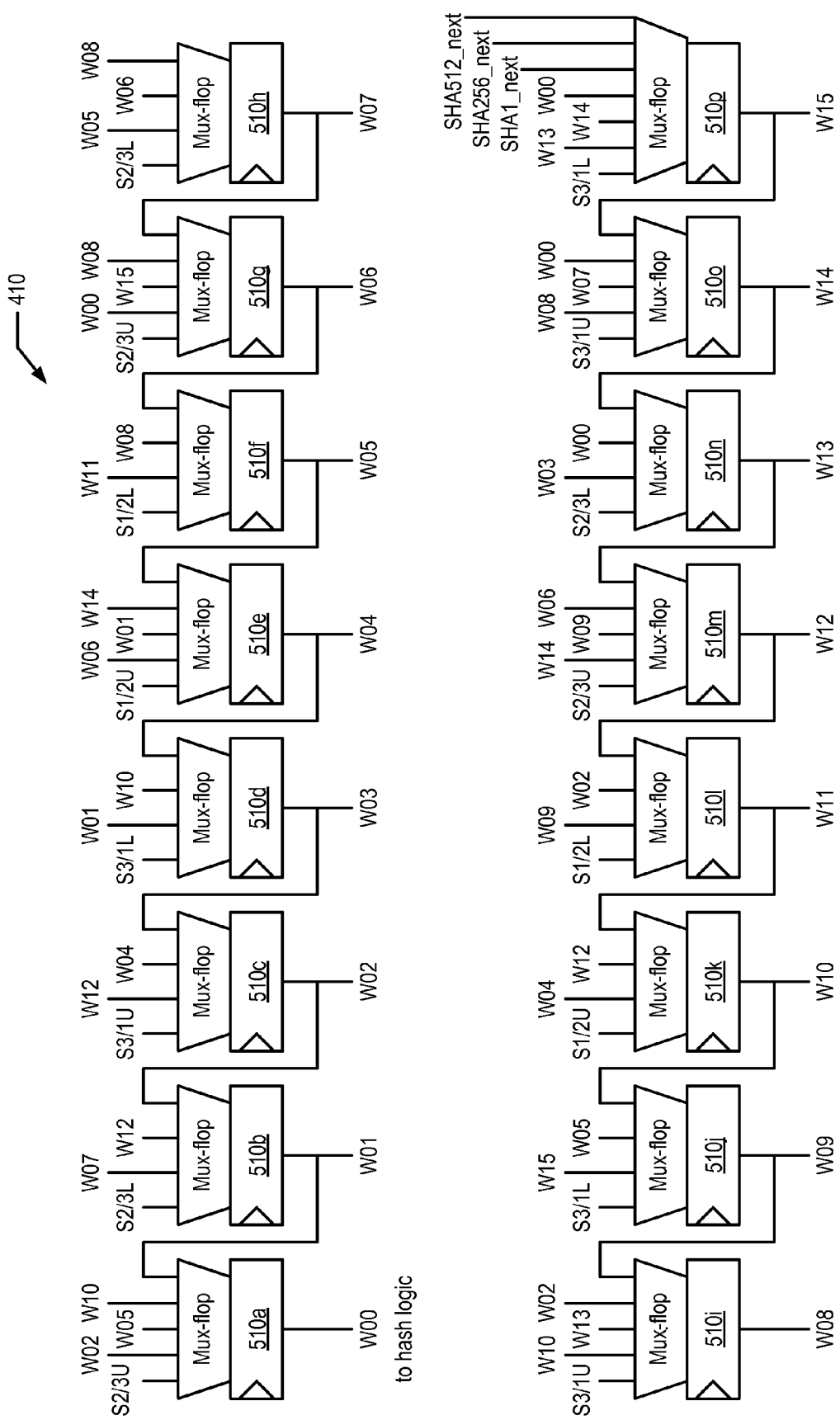
FIG. 5 is a block diagram illustrating one embodiment of a hash word buffer.

Turning to FIG. 5, a block diagram of one embodiment of a word buffer of the hash engine of FIG. 4 is shown. In the illustrated embodiment, hash word buffer 410 includes a plurality of mux-flops 510a-p corresponding respectively to sixteen data word positions W00 through W15. In one embodiment, each word position comprises 32 bits of storage for a total word buffer 410 capacity of 512 bits; however, in other embodiments it is contemplated that different numbers of data word positions and data word widths may be employed. For example, in one embodiment of word buffer 410 configured to support the SHA-512 algorithm, 16 word positions each comprising 64 bits of storage may be employed. Each of mux-flops 510 includes a plurality of inputs. In the illustrated embodiment, one input of each of mux-flops 510a-o is coupled to the output of the respective adjacent mux-flop 510b-p. Other inputs of mux-flops 510a-p are coupled to the outputs of other, nonadjacent mux-flops 510 as shown. Additionally, mux-flop 510p, corresponding to data word position W15, includes the inputs SHA1_next, SHA256_next, and SHA512_next described in greater detail below.

Also, in the illustrated embodiment, mux-flops 510a-p are coupled to three buses (e.g., S1, S2, and S3). Input buses S1, S2, and S3 may be configured to provide input data to word buffer 410, for example to load word buffer 410 with a data block to be hashed. In the illustrated embodiment, the input buses may be configured to concurrently fill any six data word positions (not necessarily adjacent) of word buffer 410. For example, for MD5, SHA-1, and SHA-256 hashes, the S2U and S2L; S3U and S3L; and S1U and S1L buses may fill six word buffer positions. In one embodiment, each of the three operand buses may be a 64-bit bus, although other embodiments are contemplated in which other bus sizes may be used. As shown, each of mux-flops 510a-p is coupled to a higher or lower portion of two of the buses. For example, mux-flop 510a is shown as coupled to the upper portions (e.g., 32 bits) of buses S2 and S3 (e.g., S2/3U). The second bus number represents the bus number that may be used during a SHA-512 hash. In other embodiments, it is contemplated that fewer or more data word positions may be concurrently filled. For example, in some embodiment SPU 300 may include a 32-bit, 128-bit or another width of an input path to word buffer 410, which may enable concurrent filling of one, four or another number of data word positions.

Collectively, mux-flops 510 may be configured to provide persistent storage for word buffer data along with selective control over the next state of the word buffer data. In the illustrated embodiment, each mux-flop 510 is shown as a single structure including a multiplexer abutting a flip-flop or register. However, in other embodiments, any suitable logic structure may be employed. For example, in one embodiment the function of mux-flop 510 may be realized by implementing one or more discrete multiplexers coupled to a register element or a register file. Alternatively, in one embodiment a memory storage element such as a random access memory (RAM) cell may be used in place of a register, and the selective multiplexer functionality may be built into the RAM cell or implemented externally to it.

In one embodiment, rather than keeping the relative data word positions fixed and having hash logic 420 iterate across the data word positions as previously described, word buffer 410 may be configured to conditionally linearly shift the stored data block by one or more data word positions according to a dynamically selectable one of a plurality of hash algorithms. That is, in one embodiment word buffer 410 may be configured to support several different hash algorithms, such as MD5, SHA-1, SHA-256, and SHA-512 (although in other embodiments, different hash algorithms may be employed, including more or fewer algorithms). A particular algorithm may be dynamically selected from the plurality of supported hash algorithms, by control signals supplied by control logic 405 in response to a particular hash instruction received by control logic 405.

After an iteration of the selected hash algorithm completes, in one embodiment word buffer 410 may be configured to linearly shift the stored data block by one data word position to the left. For example, word position W01 may be loaded into word position W00, word position W02 may be loaded into word position W01, etc. In the illustrated embodiment, the output of word position W00 is coupled to provide an input data word hash logic 420. By linearly shifting the stored data block following each iteration, the input data word to hash logic 420 may be taken from a fixed data word position (e.g., W00), in contrast to an embodiment that keeps the stored data block in fixed data word positions and configures hash logic 420 to select its input data word from a variable data word position (e.g., by using a 16:1 multiplexer as previously described).

The relations to determine the next data word value to insert for the SHA-1, SHA-256, and SHA-512 algorithms are given below, parameterized in terms of the iteration count. However, it is observed that in the embodiment of word buffer 410 illustrated in FIG. 5, the next word buffer entry is always inserted into the MSW position (W15) and therefore has an effective data word position of 16 prior to insertion. That is, for any given iteration t, the data word corresponding to iteration t occupies data word position W00, the data word corresponding to iteration t+1 occupies data word position W01, and so on, such that the data word corresponding to iteration t+15 occupies data word position W15, and the data word corresponding to iteration t+16 will occupy data word position W15 following a shift of word buffer 410. Since the data block shifts following each iteration in the illustrated embodiment, the next data value to insert is a function of the same data word positions of word buffer 410, as opposed to a fixed data word position implementation in which the next data value to insert may be a function of different data word positions for different iteration. For the word buffer 410 embodiment illustrated in FIG. 5, the SHA-1 next value relation simplifies to:

$$W[16]=\text{ROTL}\_1(W[00]\char`\^ W[02]\char`\^ W[08]\char`\^ W[13])$$

while the SHA-256 next value relation simplifies to:

$$W[16]=ss\_1\_256(W[14])+W[09]+ss\_0\_256(W[01])+W[00]$$

where ss_0_256 and ss_1_256 are defined as given above. Similarly, the SHA-512 next value relation simplifies to:

$$W[16]=ss\_1\_512(W[14])+W[09]+ss\_0\_512(W[01])+W[00]$$

where ss_0_256 and ss_1_256 are defined as given above, and which is the same as for the SHA-256 simplification. However, as shown above, the shift and rotate values are different for the SHA-512 algorithm.

Figure 6:
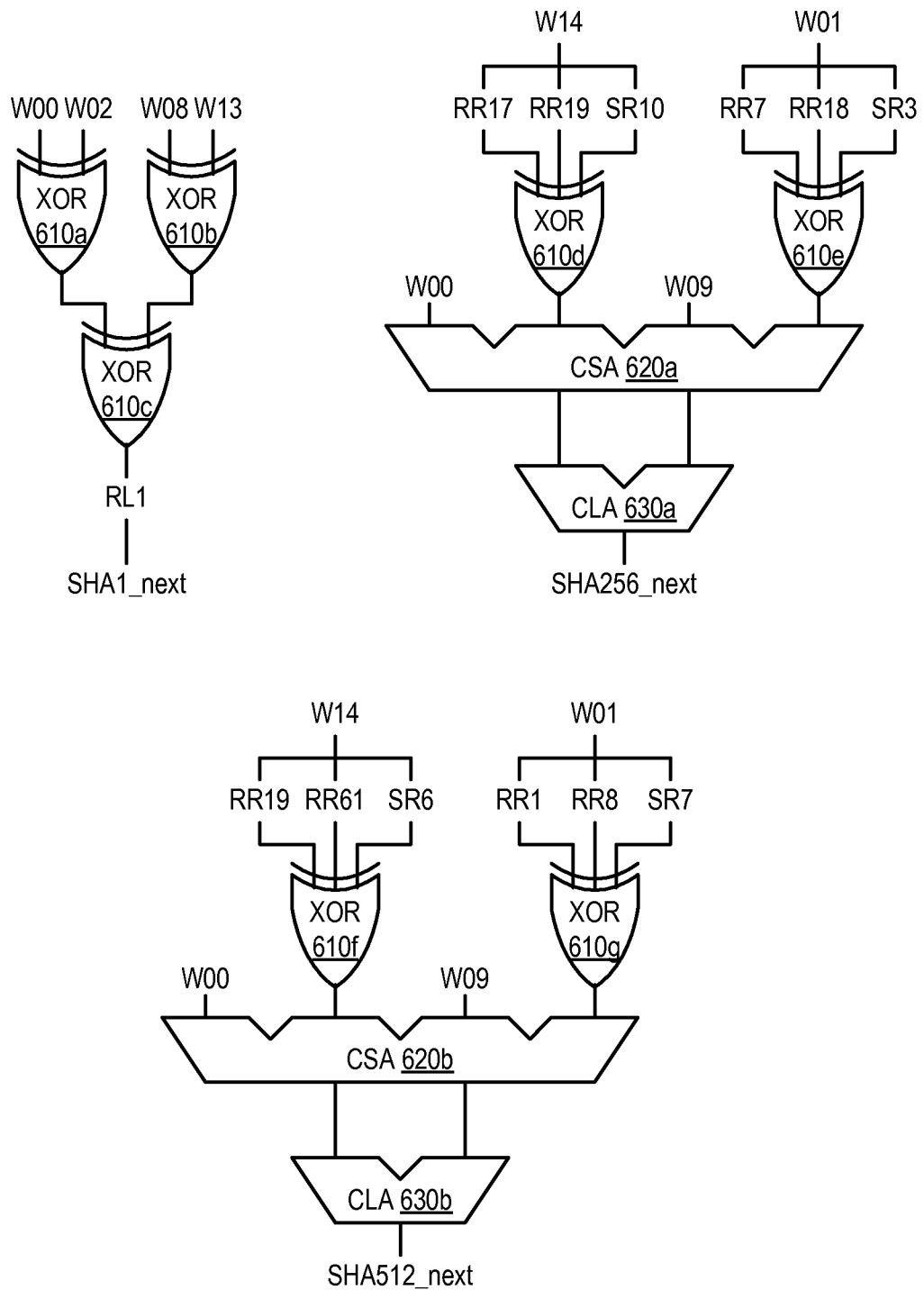
FIG. 6 is a diagram of one embodiment of logic configured to generate next values within an embodiment of the hash word buffer of FIG. 5.

One embodiment of logic configured to implement these next value relations is shown in FIG. 6. In the illustrated embodiment, the SHA-1 next value relation given above is implemented as a two-level XOR function using XOR gates 610*a-c*. The output of XOR gate 610*c* is rotated left by one bit position (RL1) to produce the SHA1_next value that forms one input to mux-flop 510*p* of word buffer 410.

The SHA-256 next value relation is implemented using several levels of logic in the illustrated embodiment. The ss_0_256(W01) function is implemented by separately rotating W01 right by 7 and 18 bit positions (RR7, RR18) as well as logically shifting W01 right by 3 bit positions (SR3), and by combining these three values in XOR gate 610*e*. Similarly, the ss_1_256(W14) function is implemented by separately rotating W14 right by 17 and 19 bit positions (RR17, RR19) as well as logically shifting W14 right by 10 bit positions (SR10), and by combining these three values in XOR gate 610*d*. Subsequently, the outputs of XOR gates 610*d-e* are accumulated along with W00 and W09 in 4:2 carry save adder (CSA) 620*a* to produce a sum and a carry term, which are then added in carry lookahead adder (CLA) 630*a* to produce the SHA256_next value that forms one input to mux-flop 510*p* of word buffer 410.

Similar to the SHA-256 logic, the SHA-512 next value relation is implemented using several levels of logic in the illustrated embodiment. The ss_0_512(W01) function is implemented by separately rotating W01 right by 1 and 8 bit positions (RR1, RR8) as well as logically shifting W01 right by 7 bit positions (SR7), and by combining these three values in XOR gate 610*g*. Similarly, the ss_1_256(W14) function is implemented by separately rotating W14 right by 19 and 61 bit positions (RR19, RR61) as well as logically shifting W14 right by 6 bit positions (SR6), and by combining these three values in XOR gate 610*f*. Subsequently, the outputs of XOR gates 610*f-g* are accumulated along with W00 and W09 in 4:2 CSA 620*b* to produce a sum and a carry term, which are then added in CLA 630*b* to produce the SHA256_next value that forms one input to mux-flop 510*p* of word buffer 410.

Numerous other varying implementations of the SHA1_next, SHA256_next, and SHA512_next functions are possible and contemplated. For example, XOR gates with differing numbers of inputs, or other types of gates that provide equivalent functionality may be employed. Different types of adders may also be used to implement the summation functions of SHA256_next and SHA512_next. In some embodiments, a shift or rotate function by a fixed number of bits, such as any of the shifts or rotates used in the next value function, may be implemented by simply hardwiring the input bits to the specified output bit ordering; in such embodiments, no active logic may be necessary to perform these shift and rotate functions.

Each of the hash algorithms described above iterates a specific number of times on a data block, and word buffer 410 may be configured to linearly shift the data block dependent on the hash algorithm that is executing. As iterations and corresponding word buffer shifting progress, in one embodiment a linear shift of word buffer 410 may result in the most significant data word position becoming vacant. For example, the SHA-1 algorithm may be configured to iterate 80 times (numbered 0 to 79) on a given data block. At the beginning of iteration 64, the SHA1_next value for iteration 79 may have already been determined and shifted into data word position W15. Following iteration 64, word buffer 410 may be linearly shifted as described above until the value for iteration 79 occupies data word position W00. However, these shifts may result in data word positions from W15 to W01 becoming vacant, as no further data values beyond iteration 79 are required.

In some instances, a given message to be hashed may include more than one data block. Accordingly, prior to executing the next hash instruction on the new block of data, the new data block may be loaded into FRF 465. In the illustrated embodiment, upon execution of the next hash instruction, if less significant data word positions are vacant, control logic 405 may cause word buffer 410 to load new data block words directly into the vacant positions, for example by directly accessing the IN0/IN1 input port of the corresponding mux-flop 510. Since in one embodiment, word buffer 410 load bandwidth exceeds the rate at which words are shifted (i.e., two data words may be loaded during a single execution cycle, whereas one data word shift may occur per iteration, which iteration may require more than one execution cycle in some embodiments), it may be possible to reduce or eliminate vacant data word positions between data blocks, which may increase overall hash algorithm performance.

Figure 7A:
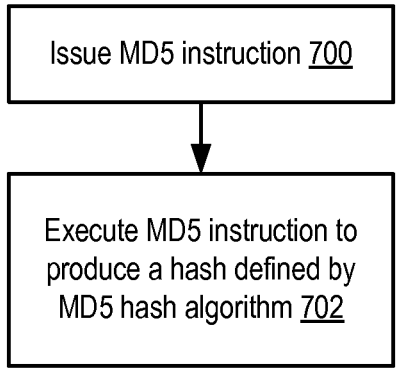
FIG. 7A is a flow diagram describing the operation of one embodiment of a processor configured to provide instruction-level support for the MD5 hash algorithm.

Turning to FIG. 7A, a flow diagram illustrating the operation of one embodiment of a processor configured to provide instruction-level support for the MD5 hash algorithm is shown. Operation begins in block 700 where an MD5 instruction, defined within the processor's ISA, is issued to a cryptographic unit for execution. For example, in one embodiment, a programmer may specify the MD5 instruction within an executable thread of code such that the instruction is fetched by instruction fetch unit 200 of processor 10, and ultimately issued by issue unit 230 to FGU 255 for execution.

In response to receiving the issued MD5 instruction, the cryptographic unit executes the MD5 instruction to produce a hash value defined by the MD5 hash algorithm (block 702). More particularly, in one embodiment, hash engine 330 within FGU 255 may be configured to execute the MD5 instruction as previously described, to operate on a number of blocks of message data to produce a 128-bit hash value. Performing the hash may include performing different types of functions. In various embodiments, executing the MD5 instruction may also include reading instruction operands from a register file (e.g., FRF 465), an operand bypass unit, or another operand source, as well as writing a result to working storage (e.g., FRF 465) or to another destination.

Figure 7B:
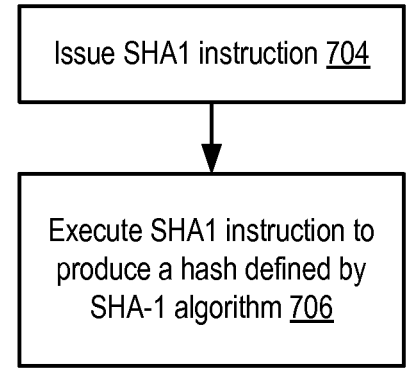
FIG. 7B is a flow diagram describing the operation of one embodiment of a processor configured to provide instruction-level support for the SHA-1 hash algorithm.

Referring to FIG. 7B, a flow diagram illustrating the operation of one embodiment of a processor configured to provide instruction-level support for the SHA-1 hash algorithm is shown. Operation begins in block 704 where a SHA1 instruction, defined within the processor's ISA, is issued to a cryptographic unit for execution. For example, in one embodiment, a programmer may specify the SHA1 instruction within an executable thread of code such that the instruction is fetched by instruction fetch unit 200 of processor 10, and ultimately issued by issue unit 230 to FGU 255 for execution.

In response to receiving the issued SHA1 instruction, the cryptographic unit executes the SHA1 instruction to produce a hash value defined by the SHA-1 hash algorithm (block 706). For example, hash engine 330 within FGU 255 may be configured to execute the SHA1 instruction as previously described to operate on a number of blocks of message data to produce a 160-bit hash value. Performing the hash may include performing different types of functions. In various embodiments, executing the SHA1 instruction may also include reading instruction operands from a register file (e.g., FRF 465), an operand bypass unit, or another operand source, as well as writing a result to working storage (e.g., FRF 465) or to another destination.

Figure 7C:
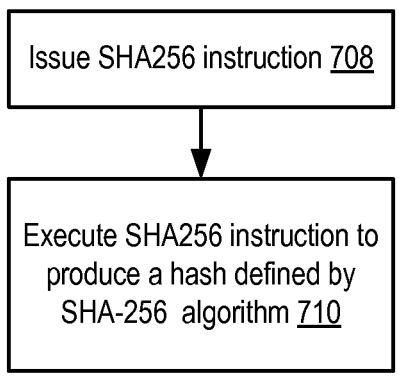
FIG. 7C is a flow diagram describing the operation of one embodiment of a processor configured to provide instruction-level support for the SHA-256 hash algorithm.

Referring to FIG. 7C, a flow diagram illustrating the operation of one embodiment of a processor configured to provide instruction-level support for the SHA-256 hash algorithm is shown. Operation begins in block 708 where a SHA256 instruction, defined within the processor's ISA, is issued to a cryptographic unit for execution. For example, in one embodiment, a programmer may specify the SHA256 instruction within an executable thread of code such that the instruction is fetched by instruction fetch unit 200 of processor 10, and ultimately issued by issue unit 230 to FGU 255 for execution.

In response to receiving the issued SHA256 instruction, the cryptographic unit executes the SHA256 instruction to apply the transformation operations to the specified input value (block 710). For example, hash engine 330 within FGU 255 may be configured to execute the SHA256 instruction as previously described to operate on a number of blocks of message data to produce a 256-bit hash value. In various embodiments, executing the SHA256 instruction may include reading instruction operands from a register file (e.g., FRF 465), an operand bypass unit, or another operand source, as well as writing a result to working storage (e.g., FRF 465) or to another destination.

Figure 7D:
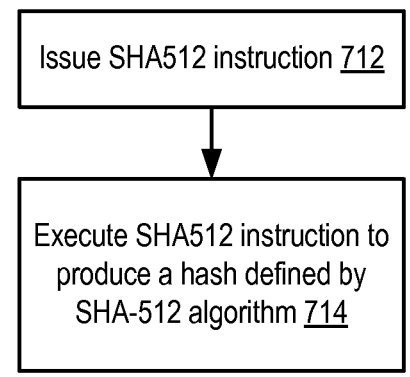
FIG. 7D is a flow diagram describing the operation of one embodiment of a processor configured to provide instruction-level support for SHA-512 hash algorithm.

Referring to FIG. 7D, a flow diagram illustrating the operation of one embodiment of a processor configured to provide instruction-level support for the SHA-512 hash algorithm is shown. Operation begins in block 712 where a SHA512 instruction, defined within the processor's ISA, is issued to a cryptographic unit for execution. For example, in one embodiment, a programmer may specify the SHA512 instruction within an executable thread of code such that the instruction is fetched by instruction fetch unit 200 of processor 10, and ultimately issued by issue unit 230 to FGU 255 for execution.

In response to receiving the issued SHA512 instruction, the cryptographic unit executes the SHA512 instruction to apply the transformation operations to the specified input value (block 714). For example, AES engine 310 within FGU 255 may be configured to execute the SHA512 instruction as previously described to operate on a number of blocks of message data to produce a 512-bit hash value. In various embodiments, executing the SHA512 instruction may include reading instruction operands from a register file (e.g., FRF 465), an operand bypass unit, or another operand source, as well as writing a result to working storage (e.g., FRF 465) or to another destination.

Exemplary System Embodiment

Figure 8:
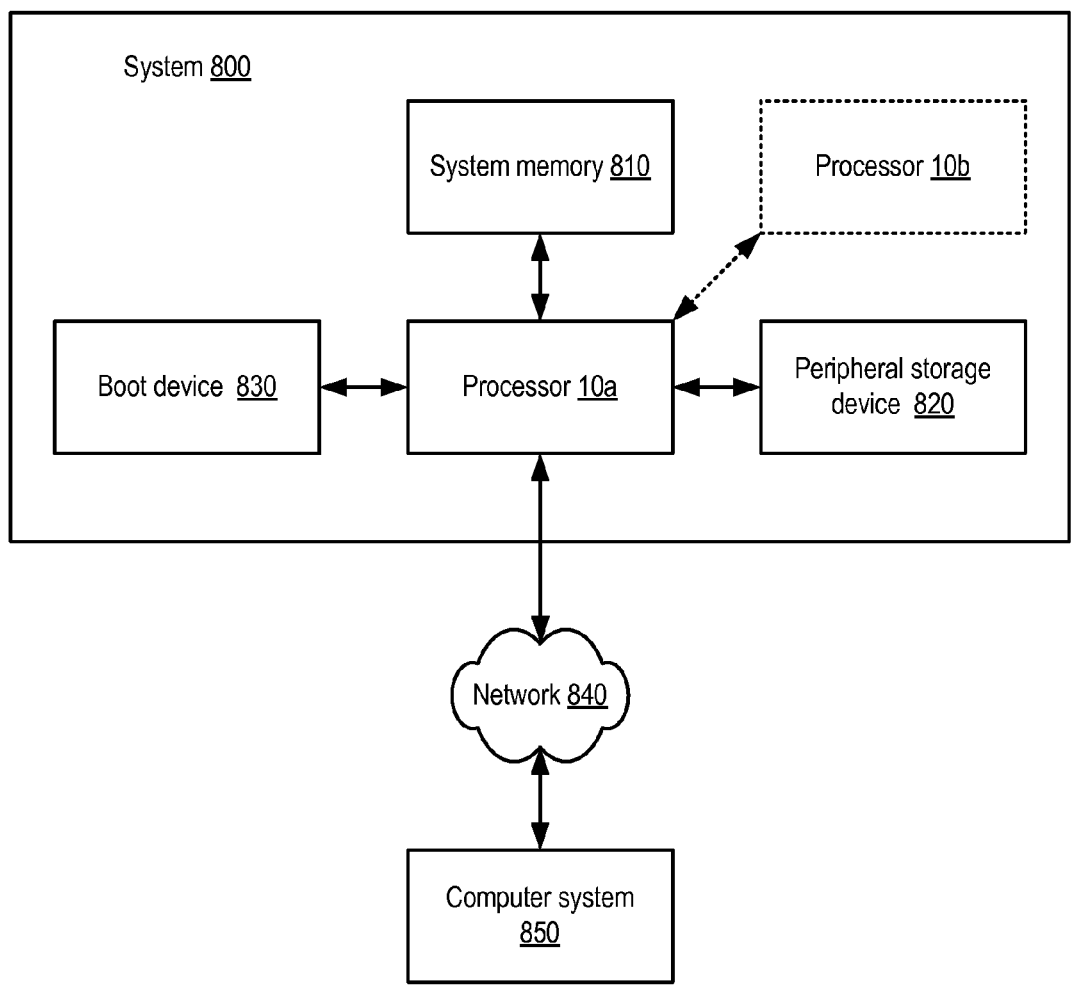
FIG. 8 is a block diagram illustrating one embodiment of a system including the multithreaded processor of FIG. 1.

As described above, in some embodiments, processor 10 of FIG. 1 may be configured to interface with a number of external devices. One embodiment of a system including processor 10 is illustrated in FIG. 8. In the illustrated embodiment, system 800 includes an instance of processor 10, shown as processor 10a, that is coupled to a system memory 810, a peripheral storage device 820 and a boot device 830. System 800 is coupled to a network 840, which is in turn coupled to another computer system 850. In some embodiments, system 800 may include more than one instance of the devices shown. In various embodiments, system 800 may be configured as a rack-mountable server system, a standalone system, or in any other suitable form factor. In some embodiments, system 800 may be configured as a client system rather than a server system.

In some embodiments, system 800 may be configured as a multiprocessor system, in which processor 10a may optionally be coupled to one or more other instances of processor 10, shown in FIG. 8 as processor 10b. For example, processors 10a-b may be coupled to communicate via their respective coherent processor interfaces 140.

In various embodiments, system memory 810 may comprise any suitable type of system memory as described above, such as FB-DIMM, DDR/DDR2/DDR3/DDR4 SDRAM, or RDRAM®, for example. System memory 810 may include multiple discrete banks of memory controlled by discrete memory interfaces in embodiments of processor 10 that provide multiple memory interfaces 130. Also, in some embodiments, system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 820 may be coupled to processor 10 via peripheral interface(s) 150 of FIG. 1.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc. In some embodiments, processor 10 may be configured to communicate with network 840 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
    an instruction fetch unit configured to issue instructions for execution, wherein the instructions are programmer-selectable from a defined instruction set architecture (ISA); and
    a cryptographic unit configured to receive instructions for execution from the instruction fetch unit, wherein the instructions include hash instructions defined within the ISA, wherein each of the hash instructions includes opcode bits and is executable by the cryptographic unit to implement a respective hash that is compliant with a respective hash algorithm specification, wherein an opcode encoded in the opcode bits of a given respective hash instruction is sufficient when executed to implement the respective hash;
    wherein in response to receiving a particular hash instruction defined within the ISA, the cryptographic unit is further configured to retrieve a set of input data blocks from a predetermined set of architectural registers of the processor, and to generate a hash value of the set of input data blocks according to a hash algorithm that corresponds to the particular hash instruction.

2. The processor as recited in claim 1, wherein the particular hash instruction comprises a Message Digest 5 (MD5) instruction defined within the ISA, wherein the cryptographic unit is further configured to execute the MD5 instruction to implement an MD5 hash that is compliant with Internet Engineering Task Force (IETF) Request for Comments (RFC) 1321.

3. The processor as recited in claim 1, wherein the particular hash instruction comprises a Secure Hash Algorithm (SHA-1) instruction defined within the ISA, wherein the cryptographic unit is further configured to execute the SHA-1 instruction to implement a SHA-1 hash that is compliant with Federal Information Processing Standards Publication 180-2 (FIPS 180-2).

4. The processor as recited in claim 1, wherein the particular hash instruction comprises a Secure Hash Algorithm (SHA-256) instruction defined within the ISA, wherein the cryptographic unit is further configured to execute the SHA-1 instruction to implement a SHA-256 hash that is compliant with Federal Information Processing Standards Publication 180-2 (FIPS 180-2).

5. The processor as recited in claim 1, wherein the particular hash instruction comprises a Secure Hash Algorithm (SHA-512) instruction defined within the ISA, wherein the cryptographic unit is further configured to execute the SHA-512 instruction to implement a SHA-512 hash that is compliant with Federal Information Processing Standards Publication 180-2 (FIPS 180-2).

6. The processor as recited in claim 1, wherein the set of architectural registers comprises a predetermined set of registers within a floating-point register file.

7. The processor as recited in claim 1, wherein the cryptographic unit comprises control logic configured to generate control signals for controlling a hash word buffer and hash logic, and to retrieve the set of input data blocks in response to executing the particular hash instruction.

8. The processor as recited in claim 7, wherein the control logic is further configured to write the hash value to specific ones of the architectural registers dependent upon which particular hash instruction being executed.

9. The processor as recited in claim 1, wherein in response to a given hash instruction being selected from the fetch unit, use of the set of architectural registers is blocked until completion of the given hash instruction.

10. A system, comprising:
    a system memory; and
    a processor coupled to the system memory;
    wherein the processor includes:
        an instruction fetch unit configured to issue instructions for execution, wherein the instructions are programmer-selectable from a defined instruction set architecture (ISA); and
        a cryptographic unit configured to receive instructions for execution from the instruction fetch unit, wherein the instructions include hash instructions defined within the ISA, wherein each of the hash instructions includes opcode bits and is executable by the cryptographic unit to implement a respective hash that is compliant with a respective hash algorithm specification, wherein an opcode encoded in the opcode bits of a given respective hash instruction is sufficient when executed to implement the respective hash;
        wherein in response to receiving a particular hash instruction defined within the ISA, the cryptographic unit is further configured to retrieve a set of input data blocks from a predetermined set of architectural registers of the processor, and to generate a hash value of the set of input data blocks according to a hash algorithm that corresponds to the particular hash instruction.

11. A method comprising:
a hardware processor issuing instructions for execution, wherein the instructions are programmer-selectable from a defined instruction set architecture (ISA); and
a hardware cryptographic unit of the processor receiving instructions for execution from the instruction fetch unit, wherein the instructions include hash instructions defined within the ISA, wherein each of the hash instructions includes opcode bits and is executable by the hardware cryptographic unit to implement a respective hash that is compliant with a respective hash algorithm specification, wherein an opcode encoded in the opcode bits of a given respective hash instruction is sufficient when executed to implement the respective hash;
wherein in response to receiving a particular hash instruction defined within the ISA, the hardware cryptographic unit retrieving a set of input data blocks from a predetermined set of architectural registers of the hardware processor, and generating a hash value of the set of input data blocks according to a hash algorithm that corresponds to the particular hash instruction.

12. The method as recited in claim 11, wherein the particular hash instruction comprises a Message Digest 5 (MD5) instruction defined within the ISA, wherein in response to receiving the MD5 instruction, the hardware cryptographic unit implementing an MD5 hash that is compliant with Internet Engineering Task Force (IETF) Request for Comments (RFC) 1321.

13. The method as recited in claim 11, wherein the particular hash instruction comprises a Secure Hash Algorithm (SHA-1) instruction defined within the ISA, wherein in response to receiving the SHA-1 instruction, the hardware cryptographic unit implementing a SHA-1 hash that is compliant with Federal Information Processing Standards Publication 180-2 (FIPS 180-2).

14. The method as recited in claim 11, wherein the particular hash instruction comprises a Secure Hash Algorithm (SHA-256) instruction defined within the ISA, wherein in response to receiving the SHA-1 instruction, the hardware cryptographic unit implementing a SHA-256 hash that is compliant with Federal Information Processing Standards Publication 180-2 (FIPS 180-2).

15. The method as recited in claim 11, wherein the particular hash instruction comprises a Secure Hash Algorithm (SHA-512) instruction defined within the ISA, wherein in response to receiving the SHA-512 instruction, the hardware cryptographic unit implementing a SHA-512 hash that is compliant with Federal Information Processing Standards Publication 180-2 (FIPS 180-2).

16. The method as recited in claim 11, wherein the set of architectural registers comprises a predetermined set of registers within a floating-point register file of the hardware processor.

17. The method as recited in claim 11, further comprising, in response to receiving the particular hash instruction, control logic within the hardware cryptographic unit controlling a hash word buffer and hash logic, and retrieving the set of input data blocks.

18. The method as recited in claim 17, further comprising the control logic writing the hash value to specific ones of the architectural registers dependent upon which particular hash instruction being executed.

19. The method as recited in claim 11, further comprising, in response to a given hash instruction being selected, a pick unit blocking access to the set of architectural registers until completion of the given hash instruction.

20. The method as recited in claim 11, wherein the ISA is compliant with one or more of IEEE 1754-1994 (SPARC Version 8), SPARC Version 9, UltraSPARC Architecture 2005, or UltraSPARC Architecture 2009.

* * * * *